United States Patent Office 3,545,271
Patented Dec. 8, 1970

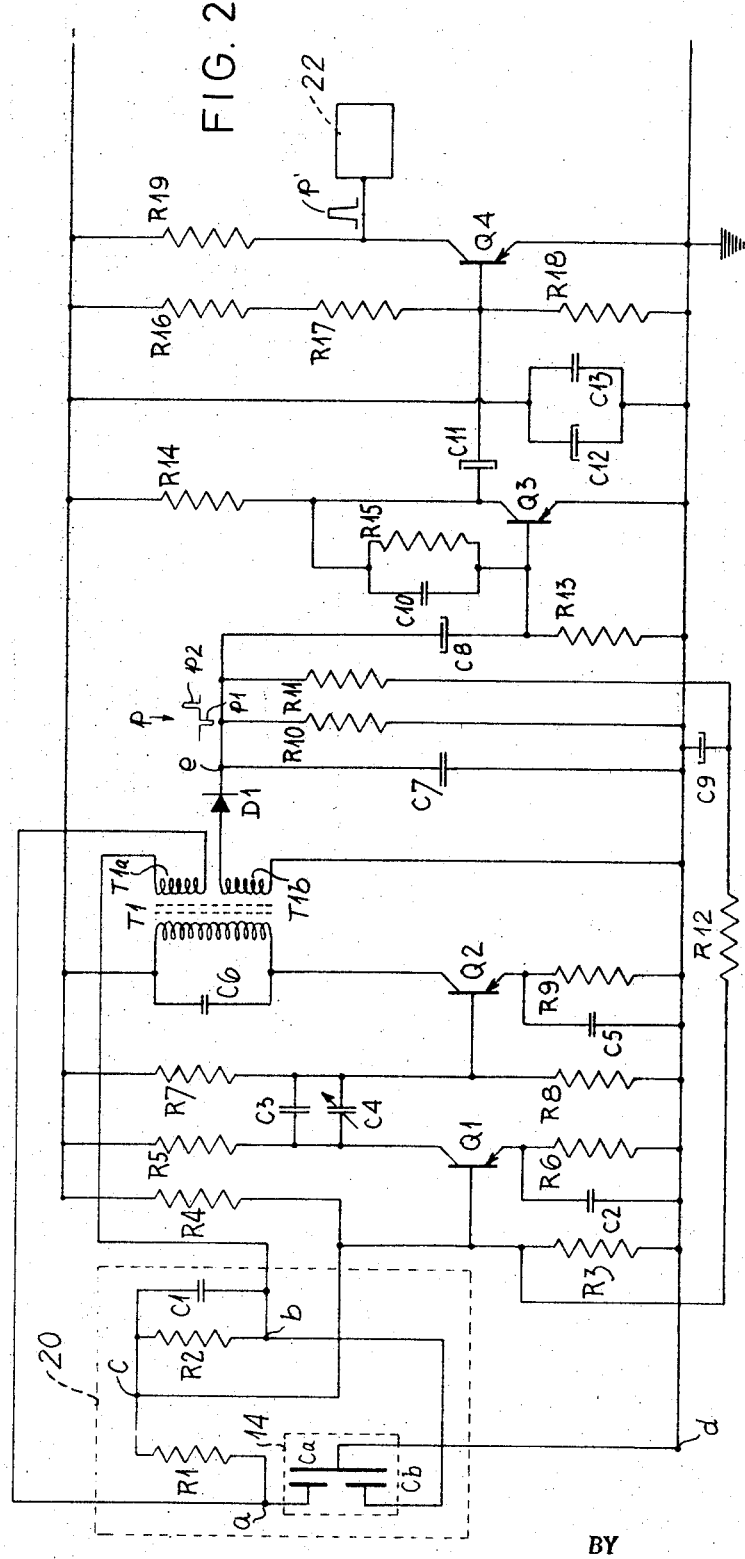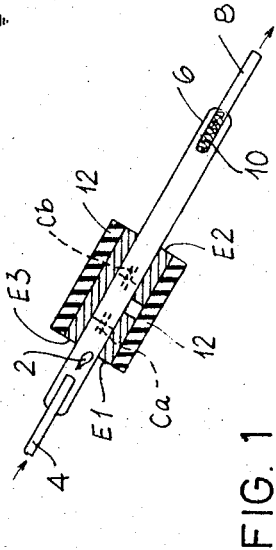

3,545,271
LIQUID DROP DETECTING SYSTEM AND SENSOR THEREFOR
Yoel Amir and Omri Talmon, Beersheva, Israel, assignors to Beta Engineering & Development Ltd., Beersheva, Israel, a company of Israel
Filed Apr. 8, 1969, Ser. No. 814,241
Int. Cl. A61m 5/16
U.S. Cl. 73—194  9 Claims

ABSTRACT OF THE DISCLOSURE

A liquid drop sensor comprises electrodes defining two closely spaced capacitors one above the other adapted to be supported in the path of the drop so that it first passes through one and then through the other thereby first changing the capacitance of one and then that of the other while the capacitance of both are affected substantially at the same time and extent by extraneous effects. A detector circuit for detecting the change in capacitance of at least one of the capacitors comprises a bridge including the two capacitors in separate arms thereof, an oscillator whose amplitude is changed by unbalance of the bridge, a slow variation compensating circuit, and a fast variation amplification circuit.

BACKGROUND OF THE INVENTION

Field of the invention

The present invention relates to liquid drop detecting systems and sensors therefor.

One application for such systems and sensors is in medical treatments involving the administration of a liquid (such as blood, plasma, and saline solutions) via the patient's vein, where drop rate regulation and monitoring are essential. Another application is in the detection of the passage of urine drops from the patient's body.

Brief description of the prior art

Drop rate regulation and monitoring in the above medical procedures are most commonly performed by surveillance and manual adjustment, but this is time consuming and cumbersome. Automatic techniques have been proposed using photocell liquid drop sensors, wherein the liquid drop is sensed by the interruption of a light beam to the photocell. However, photocell drop sensors have been found unreliable and inaccurate for several reasons. First, they are affected by the type and color of the wall of the chamber through which the drop passes, and moreover this effect is cumulative as the chamber wall tends to build up a coating or residue from the liquid. In addition, photocell drop sensors are affected by the type of liquid, since the more opaque liquid (e.g. blood) will obstruct the light more than a more transparent liquid (e.g. saline solution). In addition, photocell drop sensors require the use of lamps which consume power, generate heat, and are not reliable over long periods of use.

Other problems not completely solved by the use of photocell sensors and detecting circuits are temperature and humidity variation, and components drift.

BRIEF DESCRIPTION OF THE PRESENT INVENTION

The present invention provides a novel liquid drop sensor, and also a liquid drop detecting system using the novel sensor, which sensor and system provide improvements with respect to the above disadvantages of photocell sensors and systems. The present invention also obviates the need for a light bulb and enables the use of all solid state circuitry providing the high reliability, small size, and low maintenance advantages of such circuitry.

According to one feature of the present invention, there is provided a liquid drop sensor for sensing the passage of a liquid drop through a predetermined path, comprising, two pairs of spaced electrodes defining two closely spaced capacitors one above the other, and a support for supporting same in the predetermined path of the liquid drop so that the liquid drop first passes between the electrodes of one capacitor and then between the electrodes of the other capacitor. The capacitance of one capacitor is thus first changed and then that of the other, while the capacitance of both are affected substantially at the same time and to the same extent by effects other than the passage of the liquid drop through them.

According to another feature, the invention provides a liquid drop detecting system comprising the above novel sensor and a detector circuit for detecting the change in capacitance of at least one of the capacitors. The detector circuit comprises a bridge including the electrodes of the two capacitors in two of its arms and resistors in the remaining two arms. The bridge is unbalanced by the passage of a liquid drop through the two capacitors, a bridge-unbalance sensing circuit being provided for sensing the unbalance.

According to still further features of the invention, the bridge-unbalance sensing circuit includes an oscillator connected to the bridge such that the output of the oscillator is changed upon unbalance of the bridge. In the described embodiment, which is preferred, the amplitude of the oscillator output is changed, the arrangement being such that its amplitude is decreased when a drop passes through one capacitor and is increased when the drop passes through the other capacitor. The oscillator is connected to the bridge through a tuned amplifier, there being a positive feedback loop from the output of the oscillator to the bridge.

According to a still further feature of the invention, the bridge-unbalance sensing circuit includes means for compensating for slow variations, comprising a feedback integrating circuit connecting the oscillator output to the amplifier input to automatically vary the output of the amplifier in response to slow variations caused by effects other than the passage of liquid drops through the sensor capacitors.

The detector circuit further includes a fast variation amplification circuit comprising an amplifier coupled to the output of the oscillator and producing a saturated, fast-rising pulse in response to unbalance of the bridge. Thus an output signal is provided for each drop passing through the sensor capacitors, which signal may be used for indicating, monitoring, counting, rendering an alarm, adjusting the drop rate, or any other suitable purpose.

It has been found that very accurate and reliable liquid drop sensors and detecting systems may be constructed in accordance with the invention (which sensors and systems are very accurate and reliable even during long periods of use). Since the liquid drop passes through both capacitors of the sensor, any liquid coating or residue that tends to build up will affect both capacitors substantially at the same time and to the same extent, and therefore this effect can be cancelled out in the detecting system. Also, since the sensor does not sense an optical property of the liquid, differences in opacity in liquids or in chamber walls will not affect the readings. Other extraneous effects such as temperature and humidity variations will also affect both capacitors substantially to the same extent and therefore can be cancelled out. Further, no light bulb is required, and the sensor as well as the detecting system may be completely made of solid state circuitry, providing all the advantages of such circuitry.

Further features and advantages of the invention will be apparent from the description below.

BRIEF DESCRIPTION OF THE DRAWINGS

The invention is herein described, somewhat diagrammatically and by way of example only, with reference to the accompanying drawings, wherein:

FIG. 1 diagrammatically illustrates a liquid drop sensor constructed in accordance with the invention; and FIG. 2 is a schematic circuit of a liquid drop detecting system constructed in accordance with the invention utilizing the sensor of FIG. 1.

DESCRIPTION OF THE PREFERRED EMBODIMENT

The liquid drop sensor illustrated in FIG. 1 is used for administering liquids (e.g. blood, plasma, or saline solutions) to a patient and senses the passage of liquid drops 2 from a tube 4 through a drip chamber 6 and out through an outlet tube 8 to the patient's vein. A filter 10 is customarily provided in drip chamber 6 so as to remove any contaminants before administered to the patient's vein.

The sensor of the present invention includes a plurality of spaced electrodes E1, E2 and common electrode E3. Electrode E1 forms with common electrode E3 an upper capacitor Ca, and electrode E2 forms with common electrodes E3 a lower symmetrical capacitor Cb closely spaced below capacitor Ca. These electrodes may be supported in any suitable manner in the fixed relationship illustrated, the support in FIG. 1 being schematically shown as a bifurcated insulating member 12 carrying electrodes E1 and E2 on the inner face of one arm thereof and electrode E3 on the inner face of the other arm thereof, all the electrodes being securely held in the fixed relative position illustrated. In use, the drip chamber 6, which may be a flexible nylon bag, is applied between the arms of member 12 in the manner illustrated in FIG. 1 such that liquid drop 2 first passes between electrodes E1 and E3, thereby changing the capacitance of capacitor Ca, and then between the electrodes E2 and E3, thereby changing the capacitance of the lower capacitor Cb. The change in capacitance produced in capacitor Ca or in capacitor Cb, or in both, is used for sensing the passage of the liquid drop.

It will be appreciated that any smearing, coating or residue build-up produced by the liquid drops on the inner face of drip chamber 6, or differences in wall or liquid color or opacity, will tend to affect both capacitors Ca and Cb substantially simultaneously and to the same extent, and therefore such effects may be cancelled out by the detector circuit as will be described below. Likewise, any variation in temperature or humidity conditions will also tend to effect both at the same time and to the same extent. A reliable detecting system can therefore be provided by detecting the change in capacitance of at least one of the capacitors produced by the passage of the liquid drop therethrough, while at the same time cancelling out the effects produced in both by the above-described error-producing influences.

A detecting system that may be used is illustrated in FIG. 2. It comprises a bridge 20 including the above-described sensor, indicated within box 14. The electrodes of the sensor from capacitors Ca and Cb in separate arms of the bridge, and resistors R1 and R2 are provided for the remaining two arms. A compensation capacitor C1 is included in shunt with resistor R2 to balance the bridge. The input to the bridge 20 is applied across points a and b.

The bridge 20 is part of an oscillator, which oscillator further includes amplifier transistors Q1, Q2, and a tuned circuit including the primary winding of transformer T1, positive feedback being provided by a secondary winding of transformer T1.

More particularly, the bridge output across points c–d is applied to the input of amplifier transistor Q1. The base of transistor Q1 is biased by resistors R3 and R4, and its collector is loaded by resistor R5. The emitter of transistor Q1 includes swamping resistor R6 and a capacitor C2 providing A.C. bypass. The output from transistor Q1 is applied through coupling capacitors C3 and C4 to the base of oscillation transistor Q2. Coupling capacitor C4 is made variable in order to vary the phase of the coupling for stable oscillation. Transistor Q2 is biased by resistors R7 and R8, and the emitter of the transistor includes swamping resistor R9 and A.C. bypass capacitor C5. The tuned circuit for transistor Q2 is connected to the collector and includes capacitor C6 and the primary winding of transformer T1. Positive feedback is provided by secondary winding T1a to the input terminals a–b of the bridge 20.

The output from the oscillator is produced across secondary winding T1b, rectified by rectifier D1, and filtered by capacitor C7.

The operation of the system insofar as described i.e. up to the point e, is as follows:

It is assumed, for purposes of example, that the drops being sensed are drops of a saline solution being administered to the veins of the patient. The oscillator may be set to oscillate at a frequency of about 2 mc. When a drop 2 passes between electrodes E1 and E3, the capacitance of capacitor Ca in sensor 14 will be increased, which unbalances bridge 20 and changes the output of amplifier Q1 in a direction to dampen the output of oscillation transistor Q2. The output amplitude is therefore decreased as appearing across winding T1b and the detector D1 (at point e). As the drop continues downwardly and passes between electrodes E2 and E3, the capacitance of capacitor Cb will be increased, which unbalances bridge 20 in the opposite direction so as to increase the amplitude of the oscillations from the oscillator.

The output signal from transformer T1b, after rectified by rectifier D1 and filtered by capacitor C7, will thus be in the form of a bipolar signal p as shown in FIG. 2 at point e, including a negative-going pulse p1 produced by the passage of the drop through capacitor Ca, and a positive-going pulse p2 produced by the passage of the drop through capacitor Cb, the two pulses being separated by a short interval corresponding to the small space between electrodes E1 and E2 in the sensor 14. This bipolar output signal is coupled by resistor R10 and capacitor C8 to the input circuit of amplifier transistor Q3, wherein it is amplified as described below.

At the same time the bipolar signal is amplified by the circuit of transistor Q3, which latter may be considered to be a fast variation amplification circuit, it is also applied to a slow variation compensating circuit for compensating for slow variations due to parasitic effects, such as temperature or humidity changes, components drift, etc. The latter changes are of a long term nature, as distinguished from the fast variations produced by the passage of the drops through the sensor electrodes which occurs in about 0.1 second. The slow variations compensation circuit includes a feedback integrating circuit comprising resistors R11 and R12 connected from the output point e of the oscillator to the input of amplifier transistor Q1 to automatically vary the output thereof. This feedback integrating circuit also includes a capacitor C9 which bypasses to ground the fast variations, and therefore the output of amplifier transistor Q1 is automatically varied only by slow variations and not by fast variations.

The fast variations produced by the passage of the liquid drops through the sensor 14 are applied, as indicated above, to the input of amplifier transistor Q3 for amplification. Its base is biased by resistor R13, and its collector is loaded by resistor R14. Transistor Q3 produces positive-going output signals by means of a feedback network including capacitor C10 and resistor R15 connected between the transistor collector and base, the time from conduction to cut-off being determined by time constant of this network.

The output from amplifier transistor Q3 is applied by coupling C11 to a second amplifier transistor Q4. Filter capacitors C12 and C13 are used to filter the high and low frequency components from the power supply. The base of transistor Q4 is biased by resistors R16, R17 and R18, and its collector is loaded by resistor 19. The emitter of transistor Q4 is connected to ground.

The output from transistor Q4 is a fast-rising, saturated pulse $p'$ and is applied to a utilization device, schematically shown by block 22, which may be a counter, monitor, signal, alarm, adjusting device, or the like.

Many variations, modifications and other applications of the described embodiment of the invention will be apparent.

What is claimed is:

1. A liquid drop sensor for sensing the passage of a liquid drop through a predetermined path, comprising, two pairs of spaced electrodes defining two closely spaced capacitors one above the other, and a support for supporting same in said predetermined path so that the liquid drop first passes between the electrodes of one capacitor and then between the electrodes of the other capacitor, thereby first changing the capacitance of one and then of the other while the capacitance of both are affected substantially at the same time and to the same extent by effects other than the passage of the liquid drop therethrough.

2. A liquid drop sensor as defined in claim 1, wherein said two pairs of spaced electrodes are in the form of a first electrode, a second electrode spaced below said first electrode, and a third electrode common to both said first and second electrodes.

3. A liquid drop detecting system, comprising a sensor as defined in claim 1, and a detector circuit for detecting the change in capacitance of at least one of said capacitors.

4. A system as defined in claim 3, wherein said detector circuit comprises a bridge including the electrodes of said two capacitors in two separate arms thereof and resistors in the remaining two arms thereof, said bridge being unbalanced by the passage of a liquid drop through said two capacitors, and a bridge-unbalance sensing circuit for sensing said unbalance.

5. A system as defined in claim 4, wherein said bridge-unbalance sensing circuit includes an oscillator connected to said bridge such that the output of the oscillator is changed upon unbalance of the bridge.

6. A system as defined in claim 5, wherein said detector circuit further includes an amplifier coupled to the output of said oscillator and producing a fast-rising, saturated pulse in response to the unbalance of said bridge.

7. A system as defined in claim 5, wherein said bridge is connected to decrease the oscillator output amplitude when the drop passes through one capacitor and to increase the oscillator output amplitude when the drop passes through the other capacitor.

8. A system as defined in claim 7, wherein said oscillator is connected to said bridge through a tuned amplifier the input of which is connected to said bridge and the output of which is connected to said oscillator, there being a positive feedback loop from the output of said oscillator to said bridge.

9. A system as defined in claim 8, wherein said bridge-unbalance sensing circuit further includes means for compensating for slow variations comprising a feedback integrating circuit connecting said oscillator output to the amplifier input to automatically vary the output of said amplfier only in response to slow variations caused by effects other than the passage of liquid drops through said sensor capacitors.

References Cited

UNITED STATES PATENTS

| | | | |
|---|---|---|---|
| 3,009,101 | 11/1961 | Locher | 317—246X |
| 3,123,541 | 3/1964 | Donnell | 324—71UX |
| 3,340,400 | 9/1967 | Quittner | 324—61X |
| 3,389,601 | 6/1968 | Semplak | 73—194X |
| 3,390,577 | 7/1968 | Phelps et al. | 73—194 |

CHARLES A. RUEHL, Primary Examiner

U.S. Cl. X.R.

128—214; 317—246